United States Patent [19]

Dworski

[11] Patent Number: 4,471,556
[45] Date of Patent: Sep. 18, 1984

[54] FISH LURE

[76] Inventor: Michael Dworski, 1820 Congress Ave., Apt. 207, W. Palm Beach, Fla. 33401

[21] Appl. No.: 488,566

[22] Filed: Apr. 25, 1983

[51] Int. Cl.³ .............................................. A01K 85/00
[52] U.S. Cl. .................................. 43/42.23; 43/42.47; 43/42.48
[58] Field of Search ................. 43/42.23, 42.45, 42.48, 43/42.49, 42, 42.47; D22/48

[56] References Cited

U.S. PATENT DOCUMENTS

| | | | |
|---|---|---|---|
| 879,869 | 2/1908 | Hansen | 43/42.49 |
| 1,894,500 | 1/1933 | Sweeney | 43/42.23 |
| 2,184,031 | 12/1939 | Wyatt | 43/42.48 |
| 2,283,960 | 5/1942 | Wade | 43/42.23 |
| 2,843,966 | 7/1958 | Ingram | 43/42.23 |
| 3,133,372 | 5/1964 | Born | 43/42.49 |
| 3,490,165 | 1/1970 | Thomassin | 43/42.47 |
| 3,621,600 | 11/1971 | Dworski | 43/17.6 |
| 3,899,847 | 8/1975 | Dworski | 43/42.09 |

Primary Examiner—Gene P. Crosby
Attorney, Agent, or Firm—Charles S. McGuire

[57] ABSTRACT

A one-piece, molded plastic fish lure in the form of an artificial minnow having a head end with a plurality of spaced openings for connection of the line or leader and a tail end with an opening for mounting a hook. In plan view, the lure is symmetrical about a linear axis between the head and tail ends, having a central body portion with flat side surfaces from each of which side portions divided into forward, intermediate and rear sections, extend outwardly. The longitudinal edges of the body portion extend along curved lines about varying radii with the shortest radius of curvature being in an area about twice as far from the tail end as from the head, the radius of curvature in this portion of one edge being somewhat shorter than that of the other. The forward and rear sections of the side portions are solid while the intermediate section comprises a series of spaced ribs. The plurality of spaced openings through forward parts of the central body portion provide optional locations for attachment of the line or leader to obtain different actions of the lure as it moves through the water.

10 Claims, 6 Drawing Figures

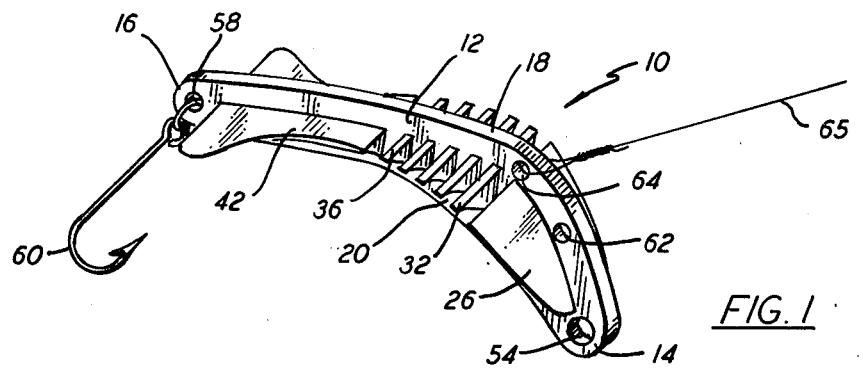
FIG. 1
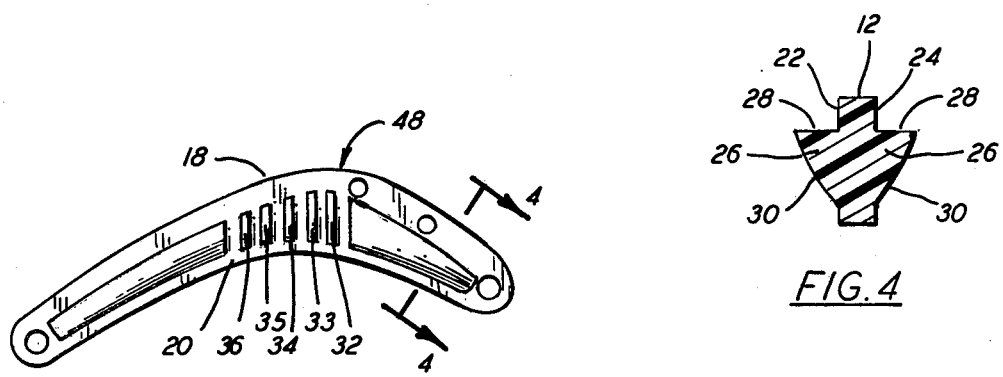
FIG. 2
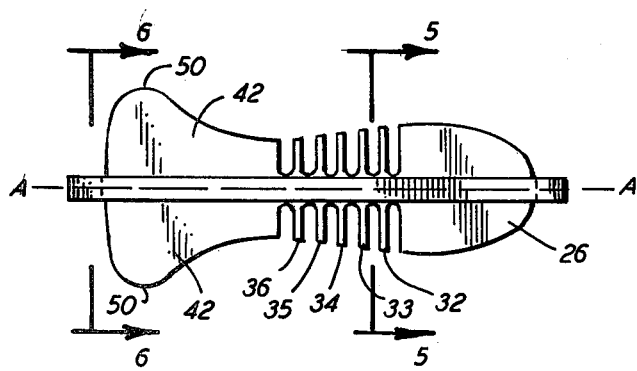
FIG. 3
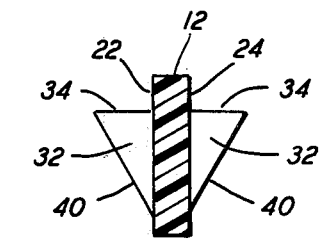
FIG. 4
FIG. 5
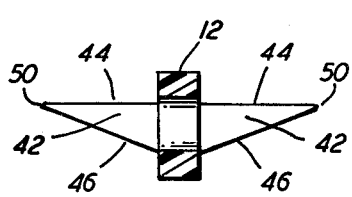
FIG. 6

FISH LURE

BACKGROUND OF THE INVENTION

The present invention relates to fish lures or artificial minnows and, more particularly, to an improved lure formed as a single, molded plastic part.

Applicant's prior U.S. Pat. No. 3,621,600 discloses an artificial minnow comprising a plurality of separate elements which are releasably threaded or snapped together to form a completed unit of selectively variable length. Applicant's U.S. Pat. No. 3,899,847 discloses several embodiments of lures of the same general type, some of which are composed of separate elements which do not require integral retaining means to remain in assembled relation, and others of which are formed as single, unitary element. All embodiments require an opening extending through the lure generally along its central axis from head to tail. The lures of both patents include a plurality of radially-extending, spaced, rib elements in at least the central body portion either completely around the lure, or in one embodiment, along the upper back portion. Fabrication of such lures by conventional plastic molding techniques has proven quite expensive relative to the desired retail price for items of this type.

It is a principal object of the present invention to provide a fish lure having the advantageous features and operation of prior lures of the same general class at significantly lower cost.

A further object is to provide a low-cost, one-piece, molded plastic fish lure having means for selectively obtaining different movements and positions of the lure as it is drawn through the water.

Other objects will in part be obvious and will in part appear hereinafter.

SUMMARY OF THE INVENTION

In accordance with the foregoing objects, the invention contemplates a fish lure which may be economically fabricated in a single piece by plastic molding techniques well-known in the art with a low rate of broken or rejected pieces. The lure is formed with a central body portion extending from head to tail ends and having flat sides. Integrally extending from each of the flat sides are portions which affect the lure's action in the water as well as its visual outline. The side portions are divided into solid forward and rear sections and an intermediate section formed by a series of ribs, evenly spaced from one another and from the forward and rear sections.

The central body portion is rectangular in plan view, lying along a straight central axis with the side portions extending outwardly symmetrically thereto. The central body portion is curved longitudinally between the head and tail ends with an area of steeper curvature (i.e., curved about a shorter radius) about one-third of the way back from the head. The forward part of the ribbed intermediate side sections and rearward part of the forward side sections lie adjacent the steeper curved area of the body portion. The side portions meet the body portion side surfaces at essentially 90° angles along one longitudinal edge and at an obtuse angle along the other.

The ribs extend outwardly to terminal ends progressively closer to the side of the body portion from front to rear. The rib terminal ends lie along a smoothly curved convex line, in plan view, which is continuous with the outer edges of both the forward and rear sections of the side portions. The frontmost rib on each side is at the apex of the curved convex line, i.e., its terminal end extends further from the body portion side surface than do those of the other ribs or the outer edge of the forward side section.

In addition to openings extending laterally through the central body portion at the head and tail ends, for attachment of line and hook, respectively, two additional openings are provided. These lie between the forward side sections and the adjacent longitudinal edge of the body portion, one adjacent the juncture of the forward and intermediate sections and the other between this opening and the one at the head end of the lure. The line or leader may be attached to the lure through any one of the three openings to control the action and orientation of the lure as it is drawn through the water.

BRIEF DESCRIPTION OF THE DRAWINGS

FIG. 1 is a perspective view of the preferred embodiment of the lure, shown with hook and line attached;

FIG. 2 is a side elevational view of the lure;

FIG. 3 is a top plan view;

FIG. 4 is a sectional view taken on line 4—4 of FIG. 2;

FIG. 5 is a sectional view taken on the line 5—5 of FIG. 3; and

FIG. 6 is a sectional view taken on line 6—6 of FIG. 3.

DETAILED DESCRIPTION

Referring now to the drawings, the fishing lure of the invention, which may be described as an artificial minnow, is denoted generally by reference numeral 10. Lure 10 is formed as a single piece of molded plastic and includes central body portion 12 having head and tail ends 14 and 16, respectively. As seen in FIGS. 1 and 2, body portion 12 is curved in side view, having curved longitudinal edges 18 and 20 and rectangular in plan view, as seen in FIG. 3, lying along and laterally symmetrical about axis A—A.

Body portion 12 has flat side surfaces 22 and 24, integrally extending from each of which are side portions, divided into forward, intermediate and rear sections, the elements of which are identified by common respective reference numerals on each side. Forward side sections 26 are essentially triangular in cross section, as seen in FIG. 4, having outer surfaces 28 which meet side surfaces 22 and 24 at substantially 90° angles, and 30 which extend from surfaces 28 to merge with body portion 12. The intermediate side sections are made up of a series of spaced ribs, a total of five on each side in the illustrated form, denoted from front to rear by reference numerals 32-36. As seen in the end view of rib 32 in FIG. 5, the ribs are essentially triangular, having surfaces 38 which meet side surfaces 22 and 24 at essentially 90° angles, and surfaces 40 which extend from surfaces 38 to side surfaces 22 and 24. Rear side sections 42 likewise have surfaces 44 meeting body portion side surfaces 22 and 24 at 90° angles, as seen in FIG. 6, and surfaces 46.

From the side elevational view of FIG. 2 it may be seen that curved edges 18 and 20 are generated about variable radii with the shortest radii, i.e., the apex of the curves, lying approximately at a point designated in FIG. 2 by reference numeral 48. The length of lure 10 from tail end 16 to point 48 is approximately twice the length from head end 14 to point 48, i.e., the lure is curved more sharply in an area about twice as close the head than to the tail. It will also be noted that point 48 of edge 18 is curved about a shorter radius than is edge 20. Furthermore, both longitudinal surfaces of the forward, intermediate and rear side meet the side surfaces of central body portion 12 along curved lines between curved edges 18 and 20, the one of such lines adjacent edge 20 being closer thereto than the opposite line is to edge 18.

From FIG. 3 it will be seen that the outlines of the side portions in plan view extend in essentially smooth or regular, convex lines from the juncture with the body portion of forward side sections 26, through all of the ribs forming the intermediate sections, to the adjoining part of rear sections 42. After joining rear sections 42, the outlines extend outwardly to provide fins denoted at their extremities by reference numeral 50. It will be noted from the plan view outline that ribs 32 extend farther from side surfaces 22 and 24 than the adjacent edges of forward sections 26, and succeeding ribs 33, 34, 35 and 36 each extend a smaller distance than the preceding rib.

Opening 54 extends laterally through body portion 12 at front end 14 for attachment of lure 10 by any conventional means to a line, leader, or other portion of the fishing tackle, which may be looped through opening 54. Likewise, opening 58 is provided adjacent tail end 16 for securing any desired, conventional, single or multiple-barbed hook means, such as that indicated in FIG. 1 by reference numeral 60. Openings 62 and 64 are also formed through body portion 12, between edge 12 and the side portions. Opening 64 is preferably located substantially adjacent the upper end of forward side section 26, and opening 62 is approximately midway between openings 54 and 64.

Openings 54, 62 and 64 provide alternate locations for attachment of the line or leader to the lure, causing the lure to behave differently as it is drawn through the water. When the line is connected through opening 54, lure 10 will remain below the water surface, oscillating from side-to-side, simulating the wiggling movement of a minnow. Attaching the line through opening 62 will cause the lure to rise, i.e., to ride higher in the water, to a position wherein a portion of the lure breaks the surface, causing some spraying or other disturbance at the surface as the lure is moved at normal trolling speeds. When the line is attached through opening 64, as indicated by reference numeral 65 in FIG. 1, lure 10 rides essentially at or upon the water surface as it is drawn along by the line.

It is also of significance that the position of the lure as it is drawn through the water at normal casting or trolling speed is reversed when the line is attached through openings 54 and 62 from that when attached through opening 64. That is, lure 10 will be oriented essentially as shown in FIG. 1, curving upwardly from head and tail ends 14 and 16 with point 48 on the top side, when the line is attached through opening 64. When the line is attached through either of openings 54 or 62, on the other hand, lure 10 will orient itself with the head and tail ends extending upwardly and point 48 on the bottom side as the lure is drawn through the water. The action and orientation of the lure may thus be selectively varied to provide better performance in specific fishing situations simply by the choice of the opening through which the line is attached.

What is claimed is:

1. A one-piece, molded plastic fish lure comprising:
   (a) a central body portion extending between head and tail ends along a central axis which is linear in plan view, and having essentially flat side surfaces with longitudinally curved edges;
   (b) side portions divided into spaced forward, intermediate and rear sections extending integrally outward from each of said body portions side surfaces symmetrically about said central axis;
   (c) said forward and rear sections of said side portions on each side comprising single, solid pieces, and said intermediate sections each comprising a plurality of spaced rib elements;
   (d) a first opening extending laterally through said body portion at said tail end thereof for attachment of hook means; and
   (e) a plurality of additional openings extending laterally through said body portion a first of said additional openings located adjacent said head end thereof and at least one other located rearwardly of said head end not more than one-third of the distance from said head end to said tail end between said side portions and one of said longitudinal edges.

2. The invention according to claim 1 wherein said body portion longitudinal edges are curved about variable radii, with a point of sharpest curvature between said head and tail ends.

3. The invention according to claim 2 wherein said point of sharpest curvature is spaced substantially half as far from said head end as from said tail end.

4. The invention according to claim 3 wherein said one other opening is located adjacent said point of sharpest curvature.

5. The invention according to claim 4 wherein the number of said additional openings is three, the third of which is located between said first and said other openings, and between said side portions and said one of said longitudinal edges.

6. The invention according to claim 5 wherein said other opening is located adjacent the juncture of said forward and intermediate sections of said side portions.

7. The invention according to claim 1 wherein said forward, intermediate and rear sections of said side portions each include surfaces meeting said body portion side surfaces at substantially 90° angles.

8. The invention according to claim 7 wherein said forward and intermediate sections of said side portions are substantially triangular in lateral cross section.

9. The invention according to claim 8 wherein the ones of said spaced ribs on each side immediately adjacent said forward sections have a terminal edge extending farther from said side surfaces than any other of said ribs.

10. The invention according to claim 9 wherein the terminal edges of said side portions in plan view extend in convex curves with respect to said body portion, from the juncture therewith of said forward section adjacent said head end, through said forward and intermediate sections to the adjacent portion of said rear sections and thence outwardly to define fin elements at the rearmost end of said rear sections.

* * * * *